United States Patent [19]
Yasuda et al.

[11] Patent Number: 4,703,021
[45] Date of Patent: Oct. 27, 1987

[54] SLIDING CONTACT TYPE CERAMICS ARTICLE AND A METHOD FOR MANUFACTURING THE SAME

[75] Inventors: Kazuyuki Yasuda, Tokyo; Sigeo Suzuki, Yokohama, both of Japan

[73] Assignee: Kabushiki Kaisha Toshiba, Kawasaki, Japan

[21] Appl. No.: 653,771

[22] Filed: Sep. 24, 1984

[30] Foreign Application Priority Data

Sep. 26, 1983 [JP] Japan ................................ 58-177372

[51] Int. Cl.[4] ................................ C04B 35/52
[52] U.S. Cl. ................................ 501/87; 428/426; 501/1; 501/94; 501/134; 501/152; 501/153; 501/154
[58] Field of Search .................... 428/426; 501/41, 87, 501/134, 152, 154, 153, 1

[56] References Cited

U.S. PATENT DOCUMENTS 4,201,530 5/1980 Vogt .................................... 425/257
4,396,682 8/1983 Mohri et al. ........................ 428/428

FOREIGN PATENT DOCUMENTS 935179 11/1955 Fed. Rep. of Germany .
367342 6/1982 Fed. Rep. of Germany .
1419400 12/1975 United Kingdom .

*Primary Examiner*—Theodore E. Pertilla
*Attorney, Agent, or Firm*—Cushman, Darby & Cushman

[57] ABSTRACT

A sliding-contact type ceramics article having a high density portion for increasing the mechanical strength of its slide-contact portion with an associated article. A method for manufacturing such a sliding-contact type ceramics article which is characterized in that, at first a compact body having a configuration which is approximate to a final article is molded in such a manner that a slide-contact portion with an associated article is intensively compressed, and then the compact body is grinded to obtain a compact body of a final configuration.

8 Claims, 5 Drawing Figures

SLIDING CONTACT TYPE CERAMICS ARTICLE AND A METHOD FOR MANUFACTURING THE SAME

BACKGROUND OF THE INVENTION (a) Field of the Invention:

This invention relates to a ceramics article adapted to be in sliding contact with an associated article during use (hereinafter referred to as a sliding contact type ceramics article) and a method for manufacturing the same.

(b) Description of the Prior Art:

In a rotary compressor for use in general in an air conditioner as shown in FIG. 1, a guide vane 3 is shown as being in sliding contact with a rotor 1 to divide the interior of a case 2. As shown also in FIG. 2, the guide vane 3 is plate-like in configuration and has a curved surface 3*a* in the direction of the thickness thereof at that end where it is in sliding contact with the rotor 1. The guide vane 3 has cutout 3*b*, 3*b* at the other end to receive a spring 4 to spring-urge the guide vane 3 in sliding contact with the rotor 1.

The guide vane for rotary compressors is conventionally formed using a molten metal. Recently, attempts have been made to mold the guide vane with the use of a ceramics material, since it is excellent in its heat-resistant and wear-resistant properties.

A conventional guide vane has been manufactured from the ceramics material by preparing a sintered body of simple configuration, such as a rectangular configuration and subjecting it to a grinding and a machining step to provide an article of the final configuration having a curved surface and cutouts.

However, the conventional method has drawbacks in that the grinding and machining steps for forming a simpler configuration into a complex configuration take lots of time and labor and involve a high manufacturing cost. In addition, the machined part of the guide vane such as a thinned part lowers its mechanical strength.

In the conventional method, a sliding-contact type ceramics article is formed to have a uniform density throughout, but has the following disadvantages:

(1) The high density and high wear-resistance cannot be attained at that part of the ceramics article which is in sliding contact with an associated article.

(2) The low density portion as opposed to the high density portion cannot be provided at that portion of the article where a lubricant should be retained to a greater extent.

SUMMARY OF THE INVENTION

One object of this invention is to provide a sliding-contact type ceramics article having a portion which is sufficient in mechanical strength and high in density and wear-resistance to permit it to be in sliding contact with an associated article.

Another object of this invention is to provide a method for readily manufacturing a sliding-contact ceramics article, such as a guide vane for rotary compressors, at low costs which has a portion adapted to be in sliding contact with an associated article during use.

According to this invention there is provided a sliding-contact type ceramics article formed of a compression-molded ceramics compact body in which at least a part of the body which is adapted to be in sliding contact with an associated article has a molded density greater than that of the rest of the body.

In another aspect of this invention a method for the manufacture of a sliding-contact type ceramics article is provided which comprises the steps of filling a powdered ceramics material into molds which are so defined as to provide a compact body of an approximate configuration to that of the final article, compression-molding it to obtain such a compact body in which at least a part of the compact body which is adapted to be in sliding contact with an associated article is formed to have a higher density than that of the rest of the article, and subjecting the compact body to a sintering and a machining step to provide a shaped, final compact body.

The method of this invention obviates the necessity of effecting an extensive machining step which has been required in the conventional method in obtaining a shaped, final article. This assures a low-cost sliding-contact type ceramics article. It is possible to prevent a lowering in the mechanical strength of the resultant structure which might otherwise occurs due to an additional extensive machining step. It is also possible to obtain a high-density part or portion of the article which is adapted to be in sliding contact with an associated article to meet the high-density and high mechanical strength requirements. It is again possible to provide a relatively low density part or portion, i.e., the rest of the article to permit a lubricant to be retained to a greater extent.

DETAILED DESCRIPTION OF THE PREFERRED EMBODIMENTS

The manufacturing method of this invention will be explained below in connection with a manufacture of a guide vane for rotary compressors.

Figure 1:
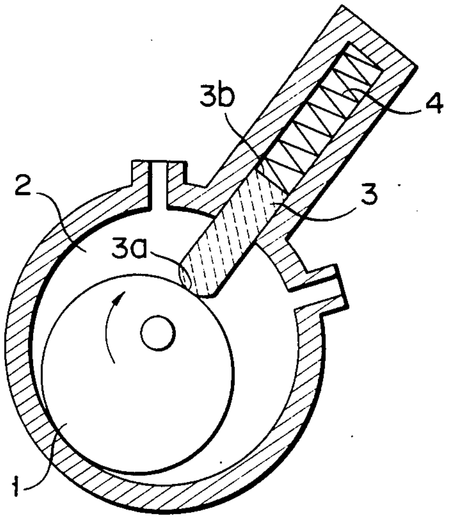
FIG. 1 is a diagrammatic view showing the cross-section of a rotary compressor.
Figure 2:
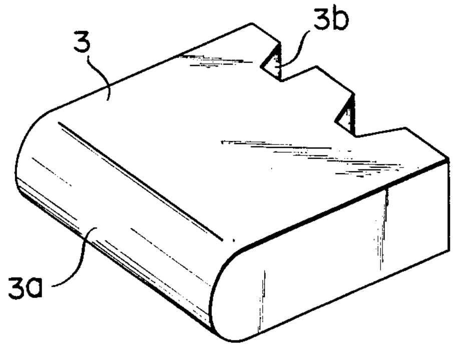
FIG. 2 is a perspective view showing a guide vane for rotary compressors.
Figure 3:
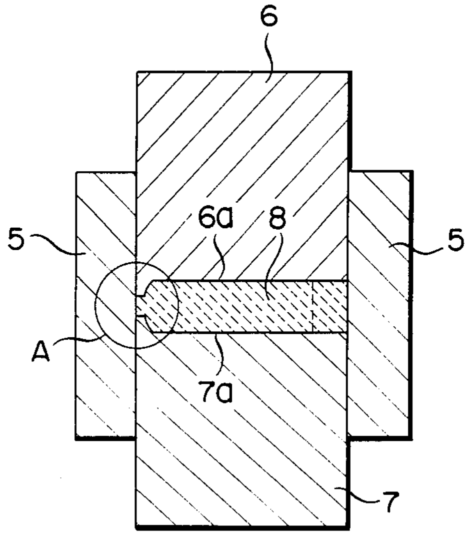
FIG. 3 is a cross-sectional view showing one aspect of a method for the manufacture of the guide vane according to this invention.
Figure 4:
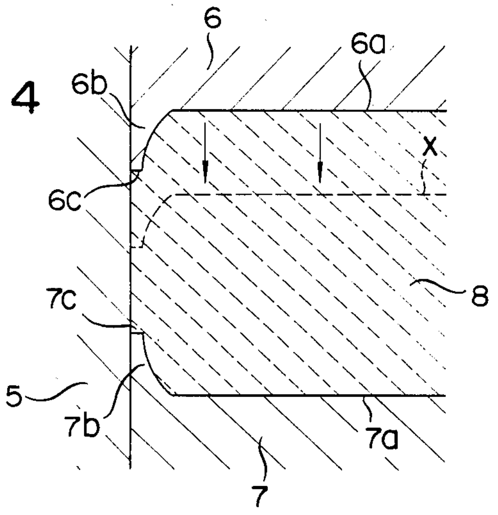
FIG. 4 is an expanded, cross-sectional view showing a portion of the guide vane as shown in FIG. 3.

A compact body corresponding to an approximate configuration of a guide vane 3 (or nearly identical with the guide vane 3) is molded by press molds. A pair of metal molds as shown in FIG. 3 is used in the mold press operation. Reference numeral 5 shows a die used together with an upper mold 6 and lower mold 7. The upper mold 6 and lower mold 7, when used in combination with the die 5 as shown in FIG. 3, have molding surfaces 6*a*, 6*b* and 7*a*, 7*b* which define a spacing substantially corresponding to the guide vane 3 having a curved section or surface 3*a* and cutouts 3*b*, 3*b* as shown in FIG. 2. Stepped sections 6*c* and 7*c* are formed at those portions of the molding surfaces corresponding to the top portion (i.e. a portion in slidable contact with a rotor 1) of the curved section 3*a* of the guide vane forwardly of the curved surfaces 6*b*, 7*b* and have a greater molded density in particular than the rest of the guide vane.

Figure 5:
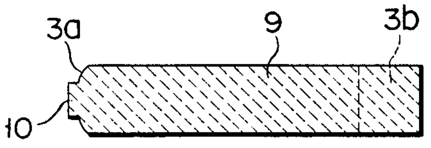
FIG. 5 is a side view in cross-section showing a compact body.

A guide vane is manufactured through the use of press molds by filling a powdered ceramic material, such as a powdered material comprising powdered silicon nitride ($Si_3N_4$), sintering assistant and binder, into an area defined by the die 5 and lower mold 7, lowering the upper mold 6 to a position as indicated by a broken line x to compress the powdered ceramic material, and manufacturing a plate-like body 9 substantially corresponding to a guide vane 3 of the final configuration (See FIG. 5). It follows that the powder 8 located between the stepped sections 6*c* and 7*c* is greatly compressed to, for example, about one-half the original volume and that the compression percentage is made necessarily smaller at the areas defined by the surfaces 6*a*, 7*a* than at the steped sections 6*c*, 7*c* due to a greater thickness assured between the surfaces 6*a*, 7*a*. As a result, the compact body i.e. a plate-like body has a high-density band-like projection 10 formed at a position corresponding to the guide vane portion is slidable contact with the rotor 1.

The compact body is sintered subsequent to a dewaxing step and the band-like projection 10 is ground to provide the top of the curved surface 3*a* as shown in FIG. 2. According to this invention no additional machining operation is necessary to form the curved surface 3*a* and cutouts 3*b*, 3*b* as in the case of the prior art. The curved section 3*a* of the guide vane 3 has a high sintered density, a greater mechanical strength and a higher resistance to tear and wear.

The curved surface 3*a* of the guide vane 3 requires a higher mechanical strength and wear-resistance due to the necessity for it to contact with the rotor 1. According to this invention the guide vane 3 of a ceramics material which is manufactured according to this invention meets such requirements.

According to this invention the ceramics component parts may be molded using either nitride-based ceramics, carbide-based ceramics or oxide base-ceramics.

The silicon nitride containing as a sintering assistant, by weight, below 10% of an oxide of rare earth elements, such as $Y_2O_3$, below 10% of aluminium oxide, below 10% of aluminium nitride and below 5% of at least one kind of oxides of Ti, Zr and Mg is excellent in wear resistance and thus desirable. With the further addition of below 5% of molybdenum carbide thereto, the wear resistance will be further improved. The sliding portion of the guide vane is desirably close-packed on the order of above 98% or preferably above 99% of density.

It is preferred that the surface roughness of the sliding portion of the guide vane be below 5 $\mu$m and desirably below 2 $\mu$m in obtaining a desired wear resistance. If the surface roughness is maintained below 5 $\mu$m, an initial wear will be much decreased and it is possible to maintain the sliding portion of the guide vane air-tight.

THE EMBODIMENT OF THE INVENTION

Guide vanes for rotary compressors were manufactured as follows:

A powdered silicon nitride including 5% $Y_2O_3$, 3% $Al_2O_3$ and 3% AlN was compressed by the lateral pressing method with the use of the press molds and under a molding pressure of 800 kg/cm$^2$ to obtain a 30 mm$\times$30 mm$\times$4 mm compact body having a configuration approximately corresponding to a guide vane having a band-like projection 10 as shown in FIG. 5. Then, the band-like projection formed on the curved surface was shaped into a curve surface by a grinding step subsequent to a dewaxing and a sintering step. As a result, about a period of about 15 minutes was taken in the grinding step (Surface roughness: 1.6 S). This time can be further reduced using a machine for such a specific purpose.

As a Control, a powdered silicon nitride was compressed with the press molds to obtain a simple, plate-like compact body having the same dimension. Then, the compact body was sintered, followed by a grinding and a machining step to obtain a guide vane of the final configuration. As a result, about 1 hour was taken in the grinding and machining steps.

In the guide vane obtained according to this invention, the curved section (i.e. a section in sliding contact with the rotor) of the guide vane had a density of 3.22 g/cm$^3$ (required: 3.24 g/cm$^3$) and the rest of it had a density of 3.18 g/cm$^3$. Tests were conducted for the wear-resistance employing this guide vane in combination with a cast iron rotor with operational conditions of 120 Hz in cycle and 300 hours in continuous operation. The guide vane obtained under the Control had a density of 3.18 g/cm$^3$ throughout and the tests with the same conditions as above were also performed for the wear-resistance.

The results of these tests are shown in Table 1 together with a case where the conventional metalic vane is employed.

TABLE 1

| | Materials | | Wear Depth of Vane ($\mu$m) | |
|---|---|---|---|---|
| | Vane | Rotor | Tip Portion | Side Portion |
| Example | $Si_3N_4$ | Cast Iron | 0.5~1 | 2 |
| Comparison Example (1) | $Si_3N_4$ | Cast Iron | 1~3 | 2 |
| Comparison Example (2) | Sintered Metal | Cast Iron | 40 | 3 |
| Comparison Example (3) | Cast Iron | Cast Iron | 100 | 7 |

Although the embodiment of this invention has been explained as having been applied to the guide vane for rotary compressors, it will be evident to those skilled in the art that this invention may also been applied to the other ceramic article which can be in sliding contact with an associated member or part.

What is claimed is:

1. A ceramics article, comprising a ceramics compact body, in which at least a part of said ceramics compact body which is adapted to be in sliding contact with an associated article has a density greater than that of the rest of said ceramics compact body.

2. A ceramics article ccording to claim 1, in which said ceramics compact body is a ewaxed, sintered compact body.

3. A ceramics article according to claim 2, in which said part of said ceramice compact body has been subjected to a grinding step subsequent to a sintering step.

4. A ceramics article according to claim 1, in which said ceramics compact body is formed from one kind of ceramics material selected from the group consisting of nitride-based ceramics, carbide-based ceramics and oxide-based ceramics.

5. A ceramics article according to claim 1, in which said rest of said compact body has a lower density than that of said part permitting greater retention of a lubricant in said rest of said compact body than in said part.

6. A method for manufacturing a ceramics article comprising a final compact body, comprising the steps of:

(a) filling a powdered ceramics material into molds;

(b) compression-molding said material to obtain a compact body having a configuration approximating that of a final compact-body in which at least a part of said compact body which is adapted to be in sliding contact with an associated article is formed to have a compressed density greater than that of the rest of said compact body; and (c) grinding said compact body to provide a shaped, final compact body.

7. A method according to claim 6, in which said grinding step is performed subsequent to sintering said compact body.

8. A guide vane for use in a rotary compressor comprising a ceramics compact body in which a curved part of said ceramics compact body which is adapted to be in sliding contact with an associated article has a density greater than that of the rest of said ceramics contact body.

* * * * *